United States Patent
Gardel et al.

(10) Patent No.: US 12,158,122 B2
(45) Date of Patent: Dec. 3, 2024

(54) NACELLE FOR AN AIRCRAFT PROPULSION ASSEMBLY COMPRISING A FLAP FOR CLOSING A RECESS FOR THE PASSAGE OF AN ACTUATOR

(71) Applicant: SAFRAN NACELLES, Gonfreville-l'Orcher (FR)

(72) Inventors: Romain Gardel, Moissy-Cramayel (FR); Pierre-Alain Reboul, Moissy-Cramayel (FR); Jérôme Corfa, Moissy-Cramayel (FR); Jean-Philippe Joret, Moissy-Cramayel (FR); Thomas Marlay, Moissy-Cramayel (FR); Matthieu Menielle, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 57 days.

(21) Appl. No.: 18/069,282

(22) Filed: Dec. 21, 2022

(65) Prior Publication Data
US 2023/0192308 A1   Jun. 22, 2023

(30) Foreign Application Priority Data
Dec. 22, 2021   (FR) ........................................ 2114201

(51) Int. Cl.
*F02K 1/76*     (2006.01)
*F02K 1/60*     (2006.01)
*F02K 1/70*     (2006.01)

(52) U.S. Cl.
CPC ................ *F02K 1/763* (2013.01); *F02K 1/60* (2013.01); *F02K 1/70* (2013.01)

(58) Field of Classification Search
CPC ... F02K 1/60; F02K 1/70; F02K 1/763; F05D 2260/50
See application file for complete search history.

(56) References Cited

U.S. PATENT DOCUMENTS

| 3,739,582 A | * | 6/1973 | Maison | F02K 1/70 |
| | | | | 239/265.29 |
| 5,913,476 A | * | 6/1999 | Gonidec | F02K 1/70 |
| | | | | 239/265.31 |
| 6,158,211 A | * | 12/2000 | Gonidec | F02K 1/70 |
| | | | | 60/226.2 |

FOREIGN PATENT DOCUMENTS

| EP | 2084062 B1 | 7/2010 |
| FR | 3053026 A1 | 12/2017 |

OTHER PUBLICATIONS

Search Report issued in French Patent Application No. 2114201 dated Aug. 4, 2022.

* cited by examiner

*Primary Examiner* — Loren C Edwards
(74) *Attorney, Agent, or Firm* — Pearne & Gordon LLP

(57) ABSTRACT

A nacelle for an aircraft propulsion assembly includes an actuator, a secondary door subject to the actuator and contributing to defining an external aerodynamic surface of the nacelle in a first position, a main door contributing to defining the external aerodynamic surface and including a recess that the actuator passes through in a deployed position but not in a retracted position, and a flap connected to the main door. The flap is movable between a closed position wherein the flap closes off at least a first region of the recess through which the actuator passes in the deployed position whereby the flap contributes to defining the external aerodynamic surface, and an open position wherein the flap is moved away from the recess so as to clear the passage for the actuator through the first region of the recess.

10 Claims, 5 Drawing Sheets

NACELLE FOR AN AIRCRAFT PROPULSION ASSEMBLY COMPRISING A FLAP FOR CLOSING A RECESS FOR THE PASSAGE OF AN ACTUATOR

BACKGROUND OF THE ART

Technical Field

The present invention relates to the field of propulsion assembly nacelles for aircraft.

In a particular non-limiting application, the invention relates to particular characteristics of a thrust reverser of such a nacelle. In another particular non-limiting application, the invention relates to particular characteristics of an intermediate of such a nacelle, including fan cowls opening by lateral pivoting, called butterfly.

State of the Prior Art

Nacelles of propulsion assemblies for aircraft are generally provided with thrust reversers intended to brake the aircraft in the landing phase.

These thrust reversers may in particular be of the door type, that is, comprising doors that can be moved between a direct thrust configuration wherein the doors are closed so as to close off respective reverser openings and channel a gas flow flowing downstream within a turbomachine of the propulsion assembly so as to generate thrust, and a thrust reversal configuration wherein the doors are open so as to release the corresponding reversal openings and be interposed against the flow of the gas stream so as to deflect it upstream and thereby contribute to braking the aircraft.

The doors of such a reverser can be pivotally mounted around respective axes fixed with respect to the nacelle, in which case the reverser is sometimes referred to as a "target" type reverser.

In other reversers, sometimes referred to as "four-bar" type reversers, the doors are each mounted on one or more four-bar mechanisms defining a more complex trajectory for each door, combining rotation and translation. Referring to the diagram of FIG. 1, such a mechanism typically includes two connecting rods 1, 2 having proximal ends 1A, 2A articulated on a beam 3 of the propulsion assembly and distal ends 1B, 2B articulated on the corresponding door 4. The respective axes of articulation A1 of proximal ends 1A, 2A are offset relative to each other in the X direction of the longitudinal axis of the propulsion assembly. The same applies with regard to the respective axes of articulation A2 of the distal ends 1B, 2B. FIG. 1 illustrates the door 4 and connecting rods 1, 2 in the direct thrust configuration in solid lines, and in the reverse thrust configuration in broken lines.

In the case of "target" type reversers, a known solution for improving the aerodynamic performance in direct thrust configuration consists of arranging a rear shroud fixed downstream of the reverser, to define a continuous trailing edge of optimal shape.

However, when the door of such a reverser approaches its open position corresponding to the reverse thrust position, the back of the door approaches the leading edge of the fixed rear shroud. To avoid interference between these elements, one solution consists of move the pivot axis of the door away from the longitudinal axis of the propulsion assembly in order to bring it closer to the back of the door and thereby reduce the gap between the pivot axis of the door and the back of the door. However, such a solution is found to be detrimental for the structural strength of the doors and the fixed structure of the nacelle, and for the reverse thrust performance of the reverser. Another solution consists of limiting the opening angle of the doors, but this is done at the cost of a limitation of the flow passage section in reverse thrust configuration, and this therefore impedes the performance of the reverser's counter thrust.

Furthermore, in cases where an internal structure, such as an injection cone or an internal secondary flow channeling shroud (commonly referred to as IFS for "Inner Fan Structure"), is present at the rear end of the propulsion assembly, the shape of the trailing edge of the door must be adapted accordingly. However, such an adaptation is not generally compatible with an absence of interference between the trailing edge of the door and the fixed rear shroud.

One solution to avoid these disadvantages consists of adding to the door, called the main door in this case, a secondary door arranged between the main door and the fixed rear shroud, and capable of pivoting along an axis located downstream with respect to the pivoting axis of the main door. The secondary door is subject to one (or more) actuator(s), itself subject to a control device of the main door, such that opening the main door causes opening of the secondary door, and closing the main door causes closing of the secondary door. The use of such a secondary door offers more latitude in the shape of the trailing edge of the main door.

However, a recess, typically in the form of a slot extending from upstream to downstream, is necessary within the main door to allow passage of the secondary door actuator in the open position.

However, such a recess impedes the aerodynamic performance of the nacelle.

Moreover, with regard to reversers of the "four-bar" type, openings are necessary within the aerodynamic surface of the nacelle to allow passage of the connecting rods forming each four-bar mechanism. In the absence of such openings, as illustrated in FIG. 1, interference between connecting rods (connecting rod 2 in the figure) and such an aerodynamic surface 5 can hinder the deployment of the four-bar mechanism. However, the dimensions required for such openings significantly impair the aerodynamic performance of the nacelle. In addition, in some cases, the trajectory of certain connecting rods is such that the openings provided for the passage of these connecting rode interrupt a fire barrier of the propulsion assembly.

SUMMARY OF THE INVENTION

The objective of the invention is in particular to provide a simple, economical and effective solution to the above problem.

To this end, it offers a nacelle for an aircraft propulsion assembly, comprising:
  a main door of a thrust reverser;
  a secondary door of the thrust reverser;
  an actuator;
  wherein:
  the secondary door is subject to the actuator such that a movement of the actuator between a retracted position and a deployed position causes a displacement of the secondary door between a first position, wherein the secondary door contributes to defining an external aerodynamic surface of the nacelle, and a second position distinct from the first position;
  the main door contributes to defining the external aerodynamic surface of the nacelle and includes a recess that the actuator passes through in the deployed position but not in the retracted position;

a flap is connected to the main door so as to be movable between a closed position, the flap closing off at least one first region of the recess through which the actuator passes in the deployed position wherein the flap contributes to defining the external aerodynamic surface of the nacelle, and an open position wherein the flap is moved away from the recess so as to clear the passage for the actuator through the said first region of the recess.

The recess prevents interference between the actuator and the main door, while the flap allows the recess to be closed off and thereby contributes to the aerodynamic performance of the nacelle.

In preferred embodiments, the nacelle includes a shutter carried by the actuator and shaped so as to close off a second region of the recess adjacent to the said first region of the recess, in the retracted position.

In preferred embodiments, the nacelle comprises a hinge connecting the flap to the main door.

In other preferred embodiments, the nacelle comprises a connecting piece made of an elastically deformable material connecting the flap to the main door.

In still other preferred embodiments, at least one part of the flap, by which the flap is directly attached to the main door, is made of an elastically deformable material, whereby the movement of the flap between the closed position and the open position results from deformation of the flap.

In preferred embodiments, the actuator and the flap include additional respective restraints which work together such that the actuator, in the retracted position, holds the flap in the closed position.

In preferred embodiments, the flap includes an anti-friction surface arranged such that the actuator exerts a support against said anti-friction surface and presses the flap towards its open position, when the actuator moves from its retracted position to its deployed position.

A trailing edge of the main door advantageously has a recessed portion, and the secondary door advantageously extends in a space delimited by the recessed portion, in aerodynamic continuity with the main door.

BRIEF DESCRIPTION OF THE DRAWINGS

The invention will be better understood, and other details, advantages and characteristics thereof will appear on reading the following description given by way of non-limiting example and with reference to the appended drawings wherein.

In all of these figures, identical references can designate identical or similar elements.

DETAILED PRESENTATION OF PREFERRED EMBODIMENTS

Figure 1:
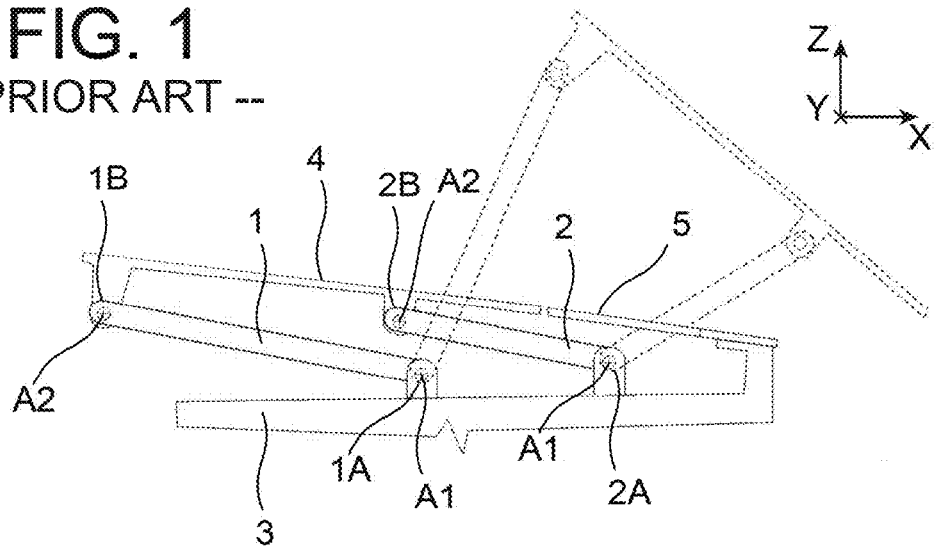
FIG. 1, already described, is a partial schematic half-view in axial section of a "four-bar" type thrust reverser of a known type of aircraft nacelle.
Figure 2:
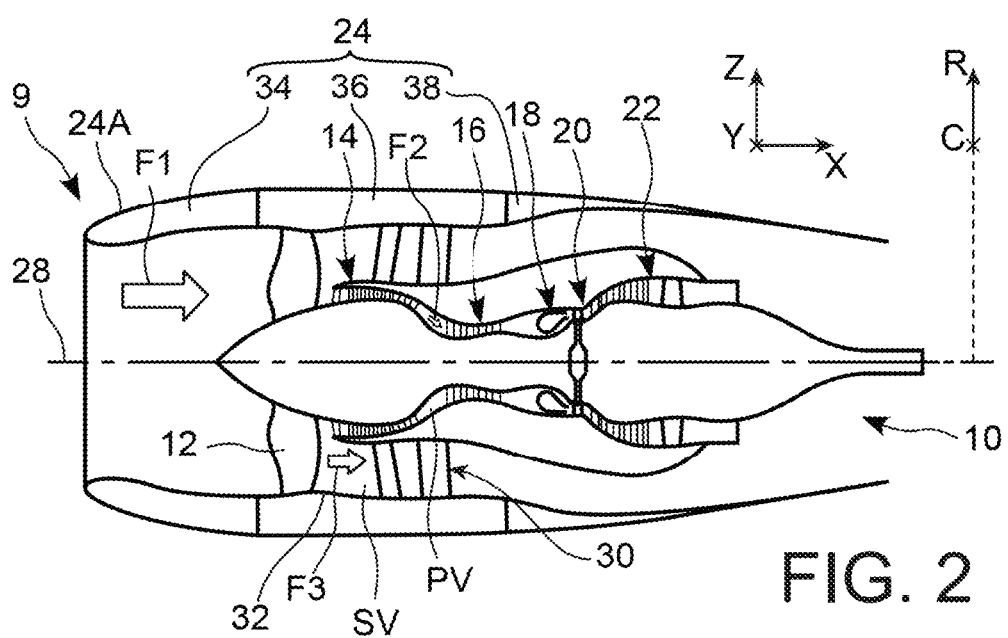
FIG. 2 is a partial schematic view in axial section of a propulsion assembly for aircraft, illustrating a nacelle and a turbojet engine thereof.

FIG. 2 illustrates a propulsion assembly 9 for aircraft, comprising a turbojet engine 10, for example of the dual flow and dual spool type, the latter generally including a fan 12 intended for suction of an air flow F1 dividing downstream of the fan into a primary stream F2 flowing in a primary stream flow channel, hereinafter called primary stream PV, within a core of the turbojet engine, and a secondary stream F3 bypassing this core in a secondary stream flow channel, hereinafter called secondary stream SV.

The core of the turbojet engine generally includes a low pressure compressor 14, a high pressure compressor 16, a combustion chamber 18, a high pressure turbine 20 and a low pressure turbine 22.

The respective rotors of the high pressure compressor and the high turbine are connected by a shaft called the "high pressure shaft", while the respective rotors of the low pressure compressor and the low pressure turbine are connected by a shaft called the "low pressure shaft", in a well-known way.

Compressors 14 and 16, combustion chamber 18 and turbines 20 and 22 form a gas generator.

The turbojet engine is fully enclosed by a nacelle 24 surrounding the secondary stream SV. In addition, the turbojet engine rotors are mounted rotatably around a longitudinal axis 28 of the propulsion assembly 9.

Throughout this description, the axial direction X is the direction of axis 28, the vertical direction Z is a direction orthogonal to axial direction X and oriented along the vertical when the propulsion assembly 9 equips an aircraft parked on the ground, and transverse direction Y is orthogonal to the two previous directions. Furthermore, the radial direction R and the circumferential direction C or azimuthal direction are defined with reference to axis 28, while the "upstream" and "front" directions on the one hand, and "downstream" and "rear" on the other hand, are defined in the direction of axis 28, in reference to the general direction of gas flow in the turbojet engine, from upstream or the front to downstream or the rear.

The turbojet engine comprises an inter-compressor casing 30 arranged axially between the low pressure compressor 14 and the high pressure compressor 16. In the non-limiting context of a dual spool turbojet engine, such an inter-compressor casing 30 is sometimes called an intermediate casing.

Furthermore, the inter-compressor casing 30 carries a fan casing 32 arranged upstream of it, around the fan 12.

In addition, the nacelle 24 comprises, from front to rear, a front cowling 34 forming an air inlet lip, an intermediate section 36, and a rear section 38.

The nacelle 24 has in particular an external aerodynamic surface 24A.

Figure 3:
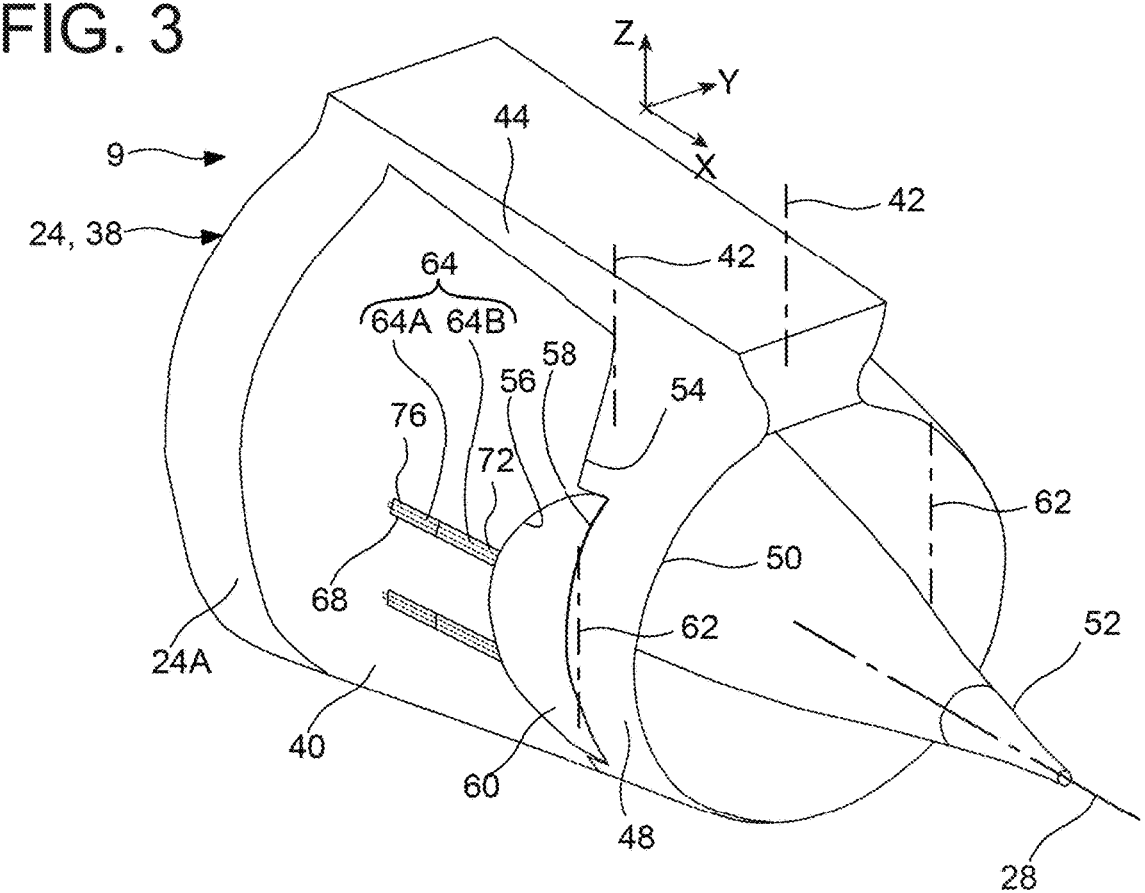
FIG. 3 is a schematic perspective view of a rear part of the propulsion assembly of FIG. 2, illustrating a thrust reverser in a direct thrust configuration.
Figure 4:
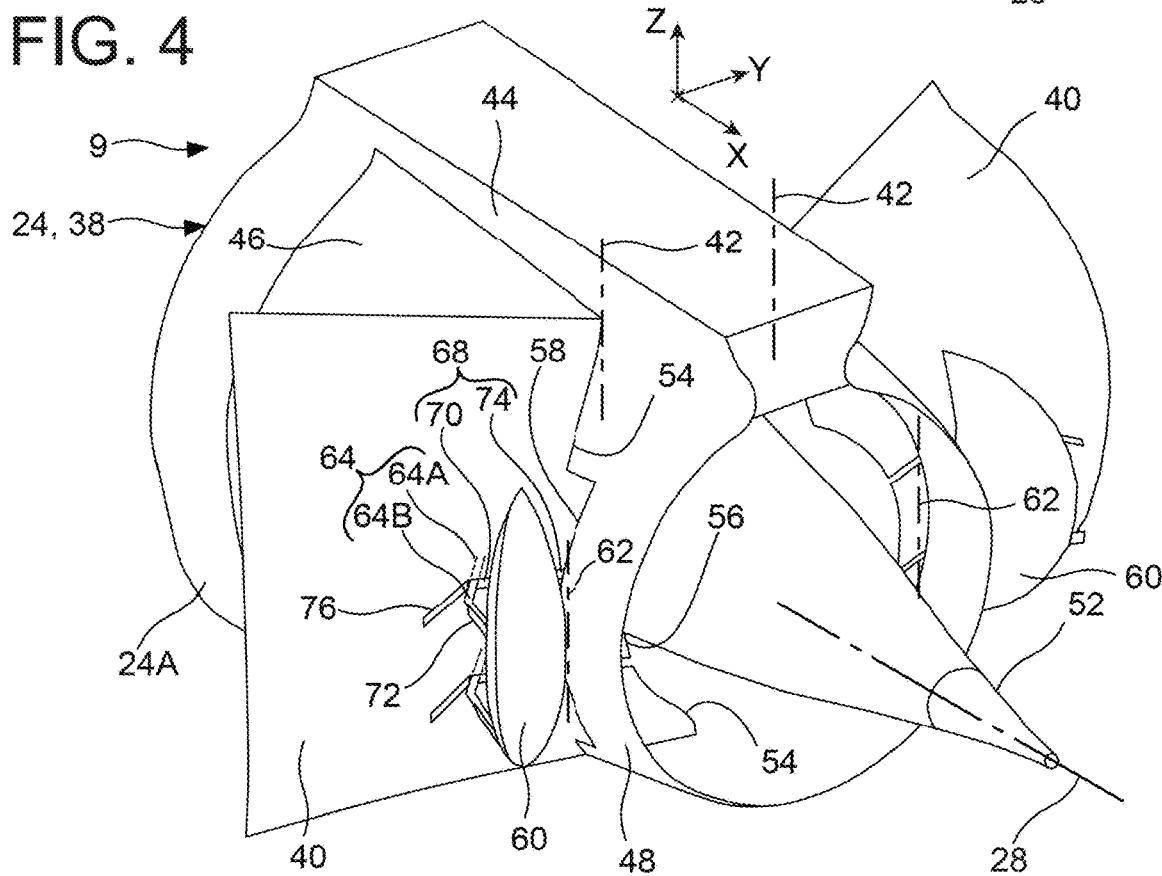
FIG. 4 is a view similar to FIG. 3, showing the thrust reverser in a thrust reversal configuration.

With reference to FIGS. 3 and 4, rear section 38 forms a thrust reverser with doors, for example of the "target" type.

Rear section 38 thus comprises two main doors 40, arranged respectively on two opposite sides of the nacelle, and pivotally mounted along respective main axes 42, with respect to a fixed part 44 of the rear section 38, such that the main doors 40 are movable between a direct thrust configuration (FIG. 3) and a reverse thrust configuration (FIG. 4).

In the direct thrust configuration, the main doors 40 are closed so as to close off the respective reversal openings 46 formed in the fixed part 44 of the rear section. The main doors 40 thereby contribute to channeling a gas stream, in this case a mixture of the primary stream F2 and secondary stream F3, flowing downstream within the turbojet engine. In addition, the main doors 40 thereby contribute to defining the external aerodynamic surface 24A of the nacelle.

In the reverse thrust configuration, the main doors 40 are open so as to release the reversal openings 46 and interpose themselves against the gas flow so as to divert the gas flow upstream and thereby redirect upstream the turbojet engine thrust 10.

The fixed part 44 of the rear section also includes a fixed rear shroud 48 externally delimiting an outlet of secondary stream SV and defining in particular a continuous trailing edge 50. The fixed rear shroud 48 also contributes to defining the external aerodynamic surface 24A of the nacelle.

Furthermore, the outlet of secondary stream SV is internally delimited by an ejection cone 52.

Each main door 40 has a trailing edge 54 shaped so as to avoid any interference with the ejection cone 52 in the reverse thrust configuration. For this purpose, trailing edge 54 includes a recessed portion 56, for example in the form of a concave circle in the downstream direction, capable of surrounding an angular portion of the ejection cove 52 in the reverse thrust configuration.

In order to avoid interference between the recessed portion 56 and a leading edge 58 of the fixed rear shroud 48, a sufficient distance is provided between these elements. In other words, a portion of each reversal opening 46 downstream of the recessed portion 56 of the trailing edge 54 of the corresponding secondary door is not closed off by it.

Also, a corresponding secondary door 60 is arranged against the recessed portion 56 of the trailing edge 54 of each main door 40 and the leading edge 58 of the fixed rear shroud 48, in order to close off the portion of the corresponding reversal opening 46 not closed off by the main door 40. At least a part of the secondary door 60 thus extends into a space delimited by the recessed portion 56.

The secondary doors 60 are arranged respectively on the two opposite sides of the nacelle, and mounted pivotally along respective secondary axes 62, with respect to the fixed part 44 of the rear section 38 of the nacelle, such that the secondary doors 60 are movable between the direct thrust configuration (FIG. 3) and the reverse thrust configuration (FIG. 4).

More specifically, in the direct thrust configuration, the secondary doors 60 adopt a first position, wherein the secondary doors close off the portions of the reversal openings 46 not closed off by the main doors 40. The secondary doors 60 thus contribute to channeling the aforementioned gas flow, in this case the mixture of primary flow F2 and secondary flow F3, and also contributing to defining the external aerodynamic surface 24A of the nacelle.

In the reverse thrust configuration, the secondary doors 60 adopt a second position, wherein the secondary doors are spaced downstream and outwards with respect to said first position, so as to allow the passage of main doors 40 through regions downstream of reversal openings 46.

The movement of each secondary door 60 is caused by one or more, in this case two, corresponding actuators 64, to which the secondary door 60 is subject.

More specifically, each actuator 64 includes a first end, on the upstream side, coupled to main door 40 or, as a variant, coupled to a device for actuating the main door 40, and a second end, on the downstream side, articulated on the corresponding secondary door 60, typically on a clevis 66 formed on an internal surface of the secondary door (visible on FIG. 4). Each actuator 64 is for example made up of a connecting rod, which can be of non-rectilinear shape, for example of bent shape.

Each actuator 64 is movable between retracted position adopted by the actuator in the direct thrust configuration (FIG. 3), and a deployed position adopted by the actuator in the thrust reversal configuration (FIG. 4).

For each actuator 64, the main door 40 considered includes a corresponding recess 68 that the actuator 64 passes through in the deployed position. It should be understood that in the deployed position (FIG. 4), a first portion, in this case an upstream portion 64A, of the actuator 64, extends from the interior side of the main door 40, while a second portion, in this case a downstream portion 64B, of the actuator 64, extends from the exterior side of the main door 40.

In the example illustrated, each recess 68 is a slot, which opens for example in the trailing edge 54 of the main door 40 considered, and which extends along the corresponding actuator 64, radially to the outside relative to it, in the direct thrust configuration (FIG. 3).

In the deployed position, each actuator 64 passes through, more precisely, a first region 70 of the corresponding recess 68 (FIG. 4), forming an upstream end portion thereof.

Furthermore, each actuator 64 carries a shutter 72 shaped to close off a second region 74 of the recess adjacent to its first region 70, in the retracted position (FIG. 3). The second region 74 forms a portion of the downstream end of recess 68.

To allow sealing or substantially sealing the second region 74 of the recess by the shutter 72, it is shaped to cover an edge of recess 68 and is therefore not able to pass through the recess. As a result, it is not possible for the shutter 72 to extend upstream so as to also cover the first region 70 of the recess 68.

In order to allow, despite everything, closing off of the first region 70 of the recess 68 in direct thrust configuration, each main door 40 is equipped with a respective flap 76 connected to the main door 40 so as to be movable between a closed position, wherein the flap closes off the first region 70 of the recess 68 (FIG. 3), and an open position wherein the flap 76 is moved away from the recess 68 so as to clear the passage for the actuator 64 through the first region 70 of the recess (FIG. 4).

Figure 5:
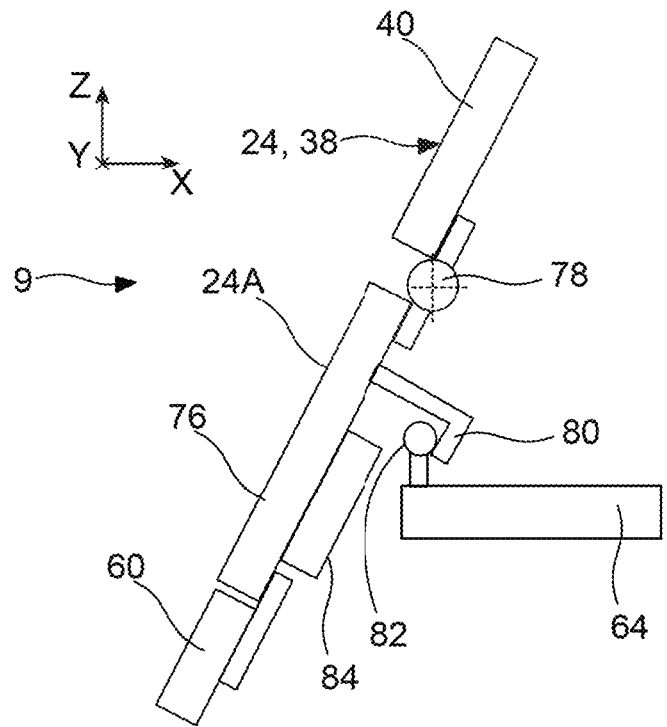
FIG. 5 is a partial schematic half-view in axial section of the thrust reverser in direct thrust configuration.
Figure 6:
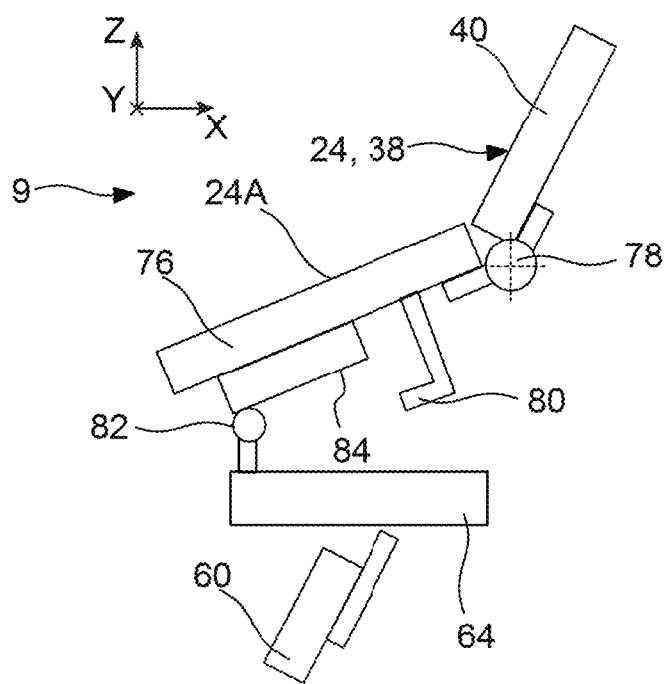
FIG. 6 is a view similar to FIG. 5, showing the thrust reverser in the thrust reversal configuration.

FIGS. 5 and 6 illustrate very schematically to main doors 40 and secondary doors 60, the actuator 64 and the flap 76.

As these FIGS. 5 and 6 show more clearly, the flap 76 is for example connected to the main door 40 by means of a hinge 78, for example a piano hinge, that is, of the type allowing a continuous connection along the entire junction between the flap 76 and the main door 40. A hinge of this type advantageously ensures sealing at the junction between the flap 76 and the main door 40.

FIGS. 5 and 6 also show additional retaining means fitted to the actuator 64 and flap 76 respectively and which are designed to cooperate so that actuator 64, in the retracted position, retains flap 76 in the closed position. Such retaining means comprise for example a hook 80 carried by the flap 76 and a retaining member 82 carried by the actuator 64 and shaped to engage with the hook 80 in the retracted position.

In addition, such retaining means advantageously contributes to driving flap 76 to its closed position by actuator 64.

Furthermore, flap 76 advantageously includes an anti-friction surface 84 arranged so that the actuator 64 presses against the anti-friction surface 84 and thus pushes flap 76 towards its open position, when actuator 64 moves from its retracted position (FIG. 5) to its deployed position (FIG. 6). The anti-friction surface 84 is arranged on the opposite side to the external aerodynamic surface 24A of the nacelle.

The principle of the invention, described above in an application to a "target" type thrust reverser, can of course be applied analogously to a "four-bar" type thrust reverser.

In the example described above, flap 76 is connected to main door 40 by means of hinge 78.

Figure 6A:
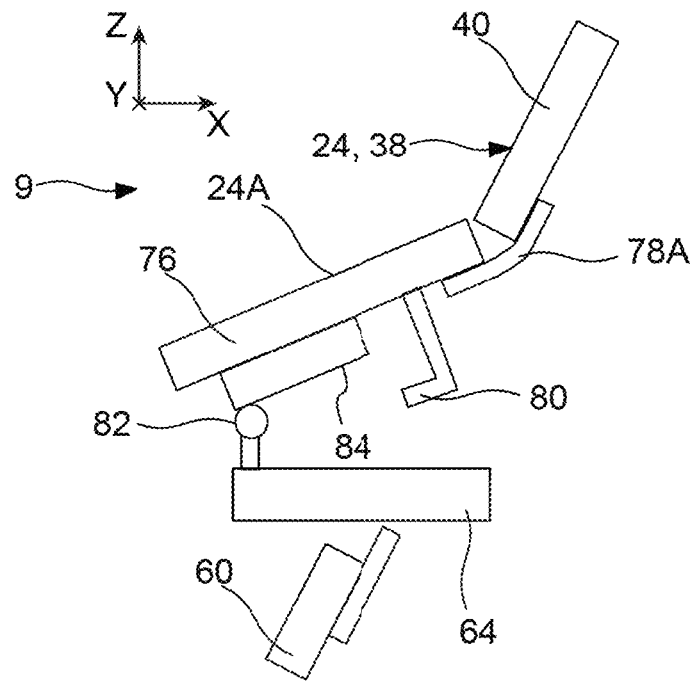
FIG. 6A is a view similar to FIG. 6, illustrating a variant.

As a variant, with reference to FIG. 6A, flap 76 can be connected to the main door by means of a connecting piece 78A made of an elastically deformable material.

Figure 6B:
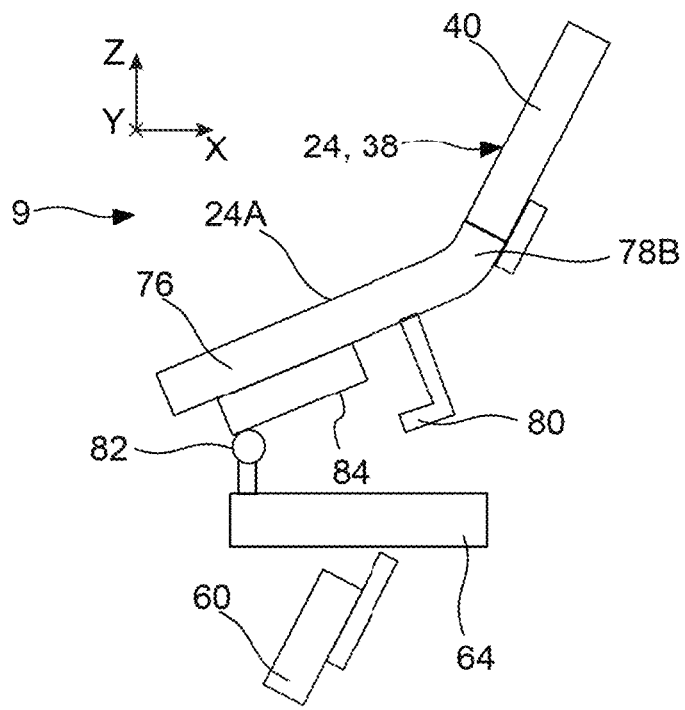
FIG. 6B is a view similar to FIG. 6, illustrating another variant.

As a further variant, with reference to FIG. 6B, flap 76 may be made of an elastically deformable material, in its entirety or at least as regards a part 78B of the flap wherein the flap is directly attached to the main door 40. In such a case, movement of the flap 76 between the closed position and the open position results from a deformation of the flap 76.

The invention claimed is:

1. A nacelle for an aircraft propulsion assembly, comprising:
   a main door of a thrust reverser;
   a secondary door of the thrust reverser; and
   an actuator,
   wherein:
   the secondary door is subject to the actuator such that a movement of the actuator between a retracted position and a deployed position causes a movement of the secondary door between a first position, wherein the secondary door contributes to defining an external aerodynamic surface of the nacelle, and a second position distinct from the first position,
   the main door contributes to defining the external aerodynamic surface of the nacelle and includes a recess through which the actuator passes in the deployed position but not in the retracted position, the recess being a slot opening in a trailing edge of the main door, and
   a flap is mounted to the main door so as to be movable between a closed position wherein the flap closes at least a first region of the recess through which the actuator passes in the deployed position whereby the flap contributes to defining the external aerodynamic surface of the nacelle, and an open position wherein the flap is moved away from the recess so as to permit the actuator to pass through said first region of the recess.

2. The nacelle according to claim 1, including a shutter carried by the actuator and shaped so as to close off a second region of the recess adjacent to said first region thereof, in the retracted position.

3. The nacelle according to claim 1, comprising a hinge connecting the flap to the main door.

4. The nacelle according to claim 1, comprising a connecting piece made of an elastically deformable material connecting the flap to the main door.

5. The nacelle according to claim 1, wherein at least a part of the flap, by which the flap is directly attached to the main door, is made of an elastically deformable material, whereby movement of the flap between the closed position and the open position results from a deformation of the flap.

6. The nacelle according to claim 1, wherein the actuator and the flap comprise respectively complementary retaining means which cooperate such that the actuator, in the retracted position, retains the flap in the closed position.

7. The nacelle according to claim 1, wherein the flap includes an anti-friction surface arranged such that the actuator presses against said anti-friction surface and pushes the flap towards the open position, when the actuator moves from the retracted position to the deployed position.

8. The nacelle according to claim 1, wherein the trailing edge of the main door has a recessed portion, and the secondary door extends in a space delimited by the recessed portion, in aerodynamic continuity with the main door.

9. The nacelle according to claim 1, the main door being pivotally mounted along a respective main axis to be movable between a direct thrust configuration and a reverse thrust configuration, wherein when the main door is in the direct thrust configuration, the main door contributes to defining the external aerodynamic surface of the nacelle, and wherein when the main door is in the reverse thrust configuration, the main door is open so as to clear a reversal opening.

10. The nacelle according to claim 1, wherein said slot opens through the external aerodynamic surface of the nacelle.

* * * * *